(12) United States Patent
Lajsner et al.

(10) Patent No.: US 6,448,736 B1
(45) Date of Patent: Sep. 10, 2002

(54) METHOD FOR CONTROLLING SWITCHED RELUCTANCE MOTOR, AND CONTROLLER

(75) Inventors: Pavel Lajsner; Radim Visinka, both of Roznov; Ivo Vecera, Ostrava, all of (CZ)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/834,866

(22) Filed: Apr. 16, 2001

(51) Int. Cl.[7] .................................................. H02P 1/46
(52) U.S. Cl. ........................ 318/701; 318/706; 318/721; 318/720; 318/254; 318/138; 318/439
(58) Field of Search ................................ 318/701, 706, 318/721, 720, 254, 138, 439, 806

(56) References Cited

U.S. PATENT DOCUMENTS

| 4,642,543 A | 2/1987 | MacMinn | 318/696 |
|---|---|---|---|
| 4,933,620 A | 6/1990 | MacMinn et al. | 318/696 |
| 5,097,190 A | 3/1992 | Lyons et al. | 318/701 |
| 5,107,195 A | 4/1992 | Lyons et al. | 318/701 |
| 5,260,635 A | * 11/1993 | Bahm | 318/701 |
| 5,325,026 A | 6/1994 | Lyons et al. | 318/254 |
| 5,793,179 A | 8/1998 | Watkins | 318/701 |
| 5,859,518 A | * 1/1999 | Vitunic | 318/701 |
| 5,955,861 A | 9/1999 | Jeong et al. | 318/701 |

* cited by examiner

Primary Examiner—Karen Masih

(57) ABSTRACT

A method to control a switched reluctance motor (SRM) with a first phase (1) and a second phase (2) comprises: aligning the rotor with the second phase (2); at a first time point ($t_1$), energizing the first phase (1) with a phase voltage that is substantially constant; monitoring an increase of the phase current ($I_1$) in the first phase (1) until the phase current reaches a maximum (302); monitoring a decrease (303) of the first current ($I_1$) until at a second time point ($t_2$) the phase current ($I_1$) reaches a minimum (304) and starts to increase again (305); de-energizing the first phase (1) at a third time point ($t_3$) that follows the second time point at ($t_2$) at a predetermined time interval; and repeating energizing, monitoring and de-energizing for the second phase (2) instead of the first phase (1).

5 Claims, 2 Drawing Sheets

METHOD FOR CONTROLLING SWITCHED RELUCTANCE MOTOR, AND CONTROLLER

FIELD OF THE INVENTION

The present invention relates in general to electrical motors, and more particularly, to a controller for a switched reluctance motor (SRM) as well as to a method to control this motor.

BACKGROUND OF THE INVENTION

SRMs are brushless electrical motors; while the stator has windings (or "coils") on each pole, the rotor does not have windings. Stator pole coils that are electrically connected in series or in parallel form a so-called phase winding (hereinafter "phase"). As illustrated, each pair of diametrically opposite coils is connected, but this is not essential. Ideally, magnetic flux entering the rotor from one stator pole balances the flux entering the rotor from the diametrically opposite stator pole, so that there is no mutual magnetic coupling among the phases.

A controller switches the phases in a predetermined sequence that is synchronized with the angular position of the rotor relative to the stator (hereinafter the position). Knowledge of the position of the rotor relative to the stator ("shaft angle") is desired at any time of operation, and especially desired when the controller initiates the rotation of the rotor during the so-called "start-up". Starting-up reliability is of premium importance.

Various methods are known in the art that address the start-up scenario; often the position is measured and position information is fed into the controller. Position measurement is performed with specially dedicated position sensors or without them ("sensorless"). Measurement can comprise the estimation of magnetic flux, phase inductance, phase current in an energized phase or in a de-energized phase, or the measurement of other physical quantities. As with each measurement, inaccuracies are contributed to, for example, the phase resistance, the ambient and phase temperatures, static fiction between rotor and stator and other factors.

For the design of SRMs, the following references are useful: U.S. Pat. No. 5,955,861 (Jeoung et al.), U.S. Pat. No. 5,793,179 (Watkins), U.S. Pat. No. 5,325,026 (Lyons et al.), U.S. Pat. No. 5,107,195 (Lyons et al.), U.S. Pat. No. 5,097,190 (Lyons et al.), U.S. Pat. No. 4,933,620 (MacMinn), U.S. Pat. No. 4,642,543 (MacMinn).

The present invention seeks to provide an improved controller as well as a method for controlling the SRM.

DETAILED DESCRIPTION OF THE DRAWINGS

Figure 1:
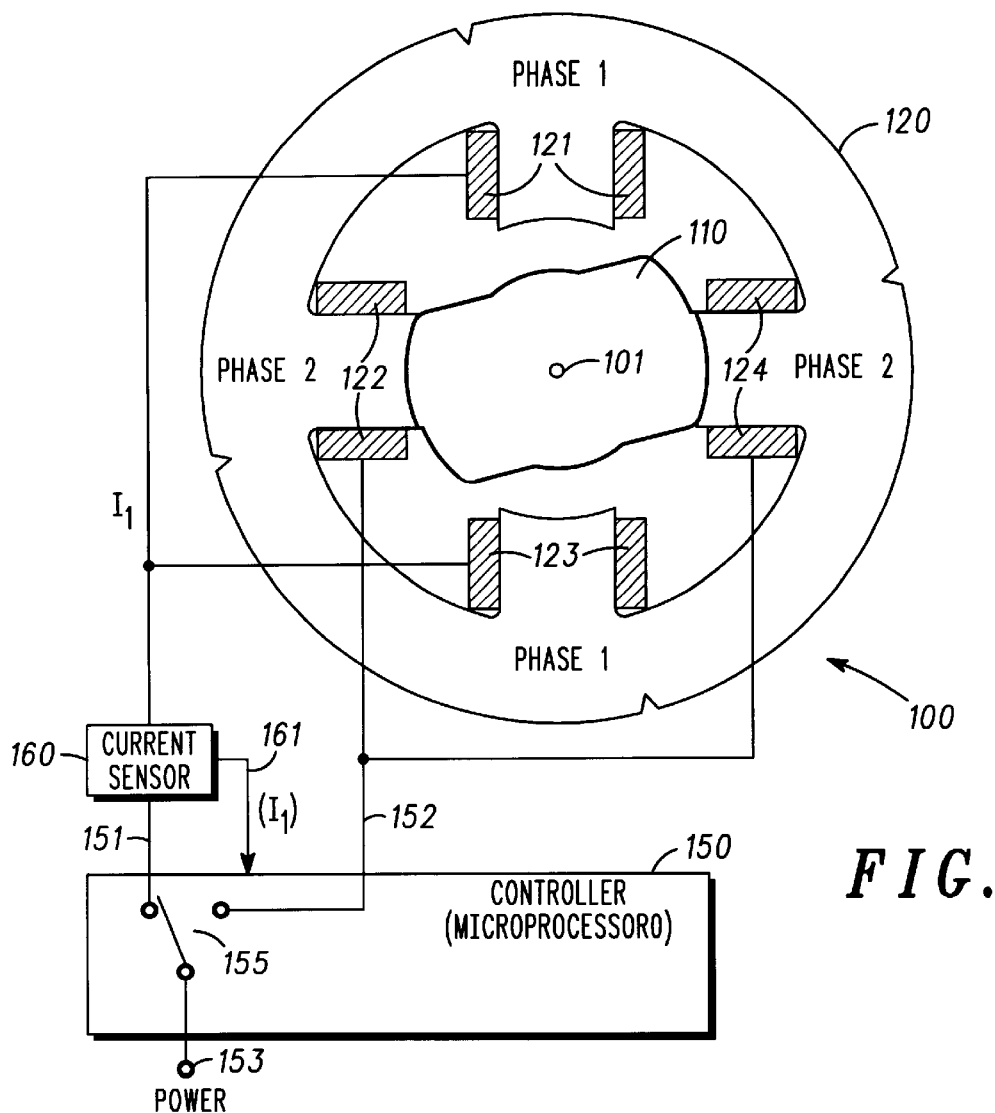
FIG. 1 illustrates a simplified diagram of a switched reluctance motor (SRM) that is coupled to a motor controller according to the present invention.

FIG. 1 illustrates a simplified diagram of switched reluctance motor (SRM) 100 that is coupled to motor controller 150 according to the present invention. Motor 100 comprises rotor 110 and stator 120; stator 120 has a plurality of coils 121, 122, 123, 124 located at stator poles. The diagram is a top view with rotational axis 101 perpendicular to the page. Having an asymmetric rotor (as illustrated) is convenient, but not essential.

Coils 121/123 and 122/124 are electrically coupled (serially or in parallel) to form a plurality of phases, with at least "first" phase 1 and "second" phase 2, respectively. For simplicity, FIG. 1 illustrates motor 100 with only two phases; it is well known in the art to provide SRMs with more than two phases.

Controller 100 energizes phases 1 and 2 via separate power supply paths 151 and 152, respectively. As symbolized by commutator switch 155 at power supply terminal 153, each supply path can be energized separately. Preferably, either phase 1 or phase 2 is energized at one time. For simplicity, FIG. 1 illustrates paths 151, 152 and terminal 153 by single wires; persons of skill in the art add the return wire, for example, to ground.

Current sensor 160 in supply path 151 of phase 1 feeds representation 161 of phase current $I_1$ back to controller 150 (closed-loop controlling). Preferably, representation 161 is numerical. Sensor 160 is conveniently implemented by a series resistor so that sensor 160 obtains numerical representation 161 via a voltage measurement and analog-to-digital (A/D) conversion, well known in the art. The resistor has a resistance value that does not substantially influence the overall performance of motor 100. Sensor 160 is—optionally—part of controller 150. Having current sensor 160 implemented in the supply path of one phase is convenient for illustration; a common current sensor can be implemented, for example, between switch 155 and terminal 153.

Illustrating sensor 160 in the supply path of a single phase only, is convenient for explanation, in order raise accuracy, persons of skill in the art can use further sensors, without departing from the present invention and without the need of further explanation herein.

As it can be seen in FIG. 1, the present invention does not require a mechanical position sensor. The position is obtained by monitoring the current.

Controller 150 is conveniently implemented by a microcontroller. When controller 150 and motor 100 are used, for example, in industrial machines, in household appliances (e.g., vacuum cleaner, food processor, air conditioner, washing machine, dish washer), vehicles (e.g., starter/generator, window lifter, pumps) or in many other applications, the microcontroller can be used for other purposes within the application.

FIG. 1 conveniently illustrates the alignment and non-alignment between rotor and phases. The rotor is in alignment with a phase (or "aligned"), when energizing the phase does not contribute to any torque, or rotation of the rotor (minimum reluctance position); accordingly, when the rotor is not in alignment with the phase (or "non-aligned"), energizing the phase moves the rotor in either direction.

As illustrated, rotor 110 is aligned with phase 2, that conveniently defines the above-mentioned rotor-to-stator position by angle P=0; rotor 110 is not aligned with phase 1.

When rotor 110 moves by a position angle of about 90 degree then rotor aligns with phase 1; for motors with more phases, rotor 110 aligns with the adjacent phase by a smaller angle. Moving rotor 110 counterclockwise would increase the angle to 90, 180 and 270 degrees before completing a 360-degree turn.

It is also well known in the art that the inductance L of each phase depends on the rotor-to-stator position; therefore, phases 1 and 2 exhibits variable inductances $L_1$ and $L_2$, respectively. For example, $L_2$ of phase 2 is high at 0 degree (as in FIG. 1), low at 90 degree, high at 180 degree, and low at 270 degree. The present invention takes advantage of this inductance-to-position dependency by keeping the phase voltage constant and monitoring the current.

Figure 2:
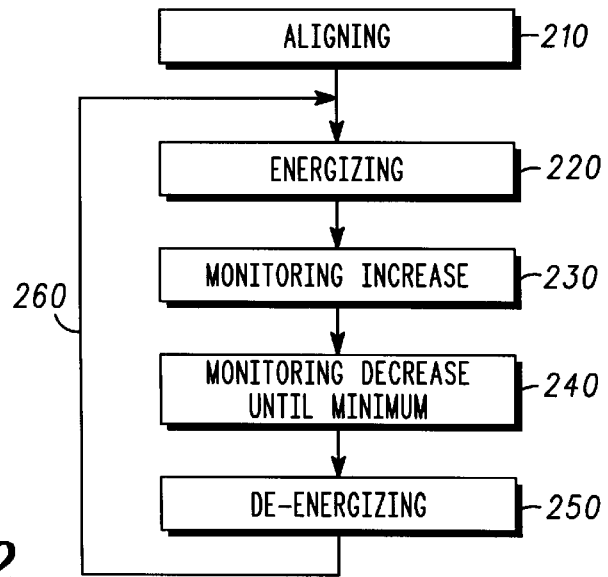
FIG. 2 illustrates a method flow chart diagram of a method to control the SRM according to the present invention.
Figure 3:
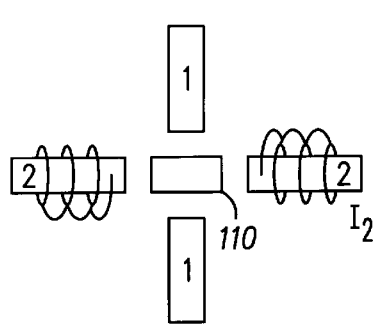
FIGS. 3–6 illustrate simplified status diagrams of the motor of FIG. 1 that is controlled by the method of FIG. 2.
Figure 4:
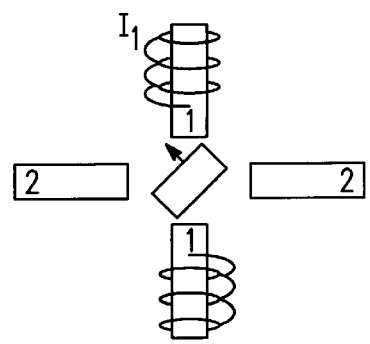
Figure 5:
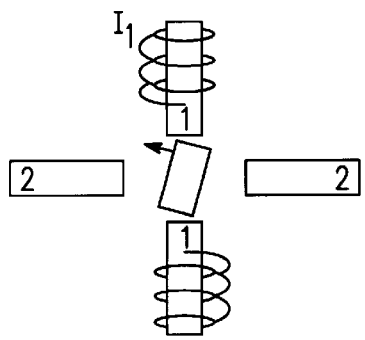
Figure 6:
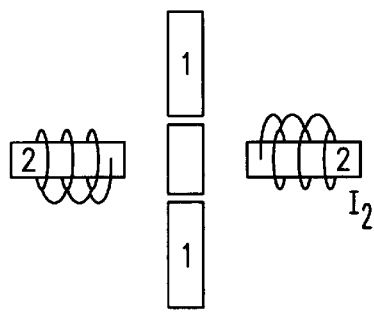

FIG. 2 illustrates a flow chart diagram of method 200 to control an SRM (e.g., motor 100) according to the present invention. Method 200 comprises the steps aligning 210, energizing 220, monitoring 230 and 240, and de-energizing 240; steps 220–240 are repeated 260.

FIGS. 3–6 illustrate simplified status diagrams of motor 100 (cf. FIG. 1) that is controlled by method 200 (cf. FIG. 2). To concentrate the illustration on the important aspects of the invention, FIGS. 3–6 show phases 1 and 2 and rotor 110 only. Wires and current symbols ($I_1$, $I_2$) around the boxes indicate an energized phase; an empty box indicates a non-energized phase ("de-energized").

Figure 7:
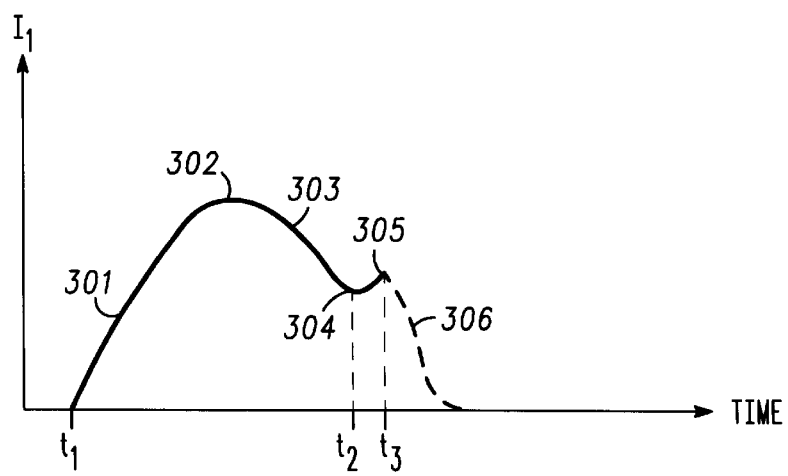
FIG. 7 illustrates a simplified time diagram of the current in one of the motor phases.

FIG. 7 illustrates a simplified time diagram of phase current $I_1$ in phase 1. Initially, current $I_1$ is substantially zero; from "first" time point $t_1$ current $I_1$ increases 301 to maximum 302; current $I_1$ then decreases 303; at "second" time point $t_2$, current $I_1$ reaches minimum 304 and starts to increase 305 again. FIG. 7 illustrates current $I_1$ until "third" time point $t_3$ (switch off) when phase 1 is de-energized by plain line 301–305; after $t_3$, current $I_1$ is illustrated by dashed line 306. The predetermined time interval between $t_2$ and $t_3$ can be zero; in other words, $t_2$ and $t_3$ can coincide.

In connection with FIGS. 1–7, method 200 is now explained with more detail. Method 200 is a method to control a switched reluctance motor having rotor and stator (cf. 110 and 120 in FIG. 1), wherein the stator has a plurality of coils (e.g., 121–124 in FIG. 1), wherein electrically coupled coils (e.g., 121/123, 122/124 in FIG. 1) form a plurality of phases with at least phases 1 and 2. Preferably, method 200 is performed by controller 150 that, preferably, performs the steps in the following order:

In aligning step 210, rotor 110 is aligned with phase 2. Preferably, this is accomplished by energizing phase 2, cf. FIG. 3. Motors that go into alignment are known in the art.

In energizing step 220, that starts at time point $t_1$ (cf. FIG. 7), phase 1 is energized with a phase voltage that is substantially constant. Phase 1 remains energized until time point $t_3$, cf. FIGS. 4–5, rotor 110 starts to rotate at time point $t_2$ (e.g., counterclockwise, as indicated by arrows).

In monitoring step 230, controller 150 monitors increase 301 of phase current $I_1$ in phase 1 until current $I_1$ reaches maximum 302. Maximum 302 occurs when the poles of rotor 110 and the stator pole with coil 121 start to overlap.

In monitoring step 240, controller 150 monitors decrease 303 of current $I_1$ until current $I_1$ reaches local minimum 304 and starts to increase 305 again at time point $t_2$. Minimum 304 occurs when inductance $L_1$ of phase 1 reaches its maximum.

In de-energizing step 250, controller 150 de-energizes phase 1 at time point $t_3$ that follows $t_2$ at the predetermined time interval.

As indicated by repetition line 260 in FIG. 2, energizing step 220 and monitoring steps 230 and 240 are repeated for phase 2 instead of phase 1. In other words, during step 250 and the repetition of step 220, switch 155 (cf. FIG. 1) commutates from phase 1 to phase 2, current $I_2$ now flows in phase 2, cf. FIG. 6). For simplicity, FIG. 1 does not illustrate a sensor for $I_2$; persons of skill in the art can provide it similar to the sensor of $I_1$. It is also possible to omit monitoring current $I_2$ and wait until the turn is on phase 1 with current $I_1$ again.

The present invention can be summarized as controller 150 that comprises: means—such as, for example, switch 155 at line 152—to align 210 rotor 110 with phase 2; means—such as, for example, switch 155 at line 151—to energize 220 phase 1 at time point $t_1$ with a voltage that is substantially constant; means—such as, for example, current sensor 160 in supply line 151—to monitor 230 increase 301 of phase current $I_1$ in "first" phase 1 until the phase current reaches maximum 302 and to monitor 240 decrease 303 of current $I_1$ until at time point $t_2$ current $I_1$ reaches minimum 304 and starts to increase again 305; and means—such as, for example, switch 155 commutating to line 152—to de-energize 250 phase 1 at time point $t_3$ that follows time point $t_2$ at a predetermined time interval.

Since current $I_1$ is related to the position (cf. overlap, non-overlap), controller 150 can even track the position. The present invention reduces the evaluation of current $I_1$ to monitoring maximum and minimum, this feature allows a non-expensive implementation well suitable for low-cost applications.

The rotation sense (example counterclockwise as illustrated) is forced by energizing phase 2 after energizing phase 1; a blocked rotor is detected as well, for example, when current $I_1$ does not change as expected (cf. FIG. 7).

The current shape of FIG. 7 is characteristic starting-up and for low-speed operation, at high speed, the control can be performed by other methods. While the invention has been described in terms of particular structures, steps, devices and materials, those of skill in the art will understand based on the description herein that it is not limited merely to such examples and that the full scope of the invention is properly determined by the claims that follow:

What is claimed is:

1. A method to control a switched reluctance motor (SRM) having a rotor and a stator, wherein the stator has a plurality of coils, wherein electrically coupled coils form a plurality of phases with at least a first phase and a second phase, the method comprising the following steps:

aligning the rotor with the second phase;

at a first time point, energizing the first phase with a phase voltage that is substantially constant;

monitoring an increase of a phase current in the first phase until the phase current reaches a maximum;

monitoring a decrease of the phase current until at a second time point the phase current reaches a minimum and starts to increase again;

de-energizing the first phase at a third time point that follows the second time point at a predetermined time interval; and repeating the energizing, monitoring and de-energizing steps for the second phase instead of the first phase.

2. The method of claim 1, wherein the predetermined time interval is zero.

3. The method of claim 1, wherein the third time point coincides with the second time point.

4. The method of claim 1, wherein said aligning step is performed by energizing the second phase.

5. A controller for a switched reluctance motor with rotor and first and second stator phases, the controller comprising:

means to align the rotor with the second phase;

means to energize the first phase at a first time point with a voltage that is substantially constant;

means to monitor an increase of the phase current in the first phase until the phase current reaches a maximum and to monitor a decrease of the first current until at a second time point the phase current reaches a minimum and starts to increase again; and means to de-energize the first phase at a third time point that follows the second time point at a predetermined time interval.

* * * * *